United States Patent [19]

Ida

[11] 4,270,152
[45] May 26, 1981

[54] MAGNETIC TAPE REPRODUCTION DEVICE

[75] Inventor: Masatoshi Ida, Hachioji, Japan

[73] Assignee: Olympus Optical Co., Ltd., Tokyo, Japan

[21] Appl. No.: 1,189

[22] Filed: Jan. 5, 1979

[30] Foreign Application Priority Data

Jan. 13, 1978 [JP] Japan .................................. 53-3189

[51] Int. Cl.³ ............................................ G11B 15/12
[52] U.S. Cl. .................................. 360/74.4; 360/74.1; 360/72.1; 360/78; 369/50
[58] Field of Search ...................... 360/74.1, 74.4, 71, 360/72.1, 78; 179/100.1 DR, 100.1 VC, 100.1 PS

[56] References Cited

U.S. PATENT DOCUMENTS

| | | | |
|---|---|---|---|
| 3,461,249 | 8/1969 | Kamosi et al. | 360/74.4 |
| 3,573,393 | 4/1971 | Blackie et al. | 360/74.4 |
| 3,647,989 | 3/1972 | Mattas | 360/74.2 X |
| 3,911,487 | 10/1975 | Cadriere | 360/74.4 X |
| 3,918,086 | 11/1975 | Blackie et al. | 360/74.4 X |
| 3,918,090 | 11/1975 | Ludwig | 360/72.1 |
| 4,180,838 | 12/1979 | Fehrenkamp | 360/72.1 |

Primary Examiner—John H. Wolff

[57] ABSTRACT

Provided is a magnetic tape reproduction device which comprises a tape driving circuit for driving a magnetic tape, first and second reproducing heads disposed respectively in correspondence to first and second tracks of the magnetic tape, and an auto-reverse circuit for automatically reversing the magnetic tape by detecting a terminal end thereof. The auto-reverse circuit sets the second reproducing head to a mode of reproduction when the first reproducing head reproducing the recorded information of the magnetic tape has detected that an output signal corresponding to a non-signal portion of the magnetic tape continues to be generated for a specified period of time, and, when the second reproducing head set to the mode of reproduction has detected that an output signal corresponding to a non-signal portion of the magnetic tape continues to be generated for a specified period of time, supplies a reverse signal to the tape driving circuit.

7 Claims, 6 Drawing Figures

MAGNETIC TAPE REPRODUCTION DEVICE

BACKGROUND OF THE INVENTION

This invention relates to a magnetic tape reproduction device having an auto-reverse function.

Conventionally, various types of tape recorders are proposed which are each designed to automatically reverse the recording tape to continuously reproduce the information recorded in the tape. For example, there is a cassette tape recorder in which when it is detected that the shafts of the feed and tape-up reels for the magnetic tape have stopped rotation a pulse signal is generated and used as a signal for energizing a driving circuit for the auto-reverse mechanism. In this type of tape recorder, however, elements constituting a circuit for generating the energizing pulse increase in number. This causes an increase in the manufacturing cost of the resulting tape recorder. Further, in this tape recorder, it is necessary to cause generation of the energizing pulse after completion of the reel-shaft rotation. This results in a low response characteristic in auto-reverse operation.

There is another example of tape recorder in which a period of reference time as previously set is compared with a period of travel time for a non-signal portion of the tape to be continuously detected and which, when a detecting means has detected that the latter period of travel time is longer than the former period of reference time, causes the detecting means to generate an energizing pulse thereby to cause automatic reverse of the tape. In this type of tape recorder, however, very likely to occur is an erroneous operation that a non-signal portion or zone between the recorded items of information, such as a non-recorded portion between passages in a music tape, is detected as the absence of signals in which state auto-reverse operation is carried out. This may raise inconvenience in reproduction. Further, where the tape is auto-reversed after completion of, for example, one music, this type of tape recorder inconveniently permits reproduction in a halfway of a music which is recorded or the other track and is to be reproduced next.

SUMMARY OF THE INVENTION

It is, accordingly, the object of the invention to provide a magnetic tape reproduction device which detects a non-signal portion or zone of the tape end or a non-signal portion between the recorded items of information to reproduce the recorded information without giving rise to any of the above-mentioned problems.

According to one embodiment of the invention, a magnetic tape reproduction device is provided which comprises:

tape driving means for driving a magnetic tape having a plurality of recording tracks, reproducing means for reproducing information recorded in the magnetic tape, detecting means which produces a first output signal when having detected that the output signal corresponding to a non-signal region of a first recording track of the tape travelling in a first direction to be reproduced by said reproducing means, continues to be generated for a specified period of time from said reproducing means and produces a second output signal when having detected that the output signal corresponding to a non-signal region of a second recording track of the tape travelling in said first direction, continues to be generated for a specified period of time from said reproducing means, first control means responsive to the first output signal from the detecting means for supplying an output signal to set the reproducing means in a first operation mode to pick up information recorded on the second recording track, and second control means responsive to the second output signal from the detecting means for applying its output signal to the driving circuit to drive the tape in a second direction opposite to said first direction.

DETAILED DESCRIPTION OF THE PREFERRED EMBODIMENTS

A magnetic tape reproduction device according to an embodiment of the invention will now be described with reference to the accompanying drawings.

Figure 1:
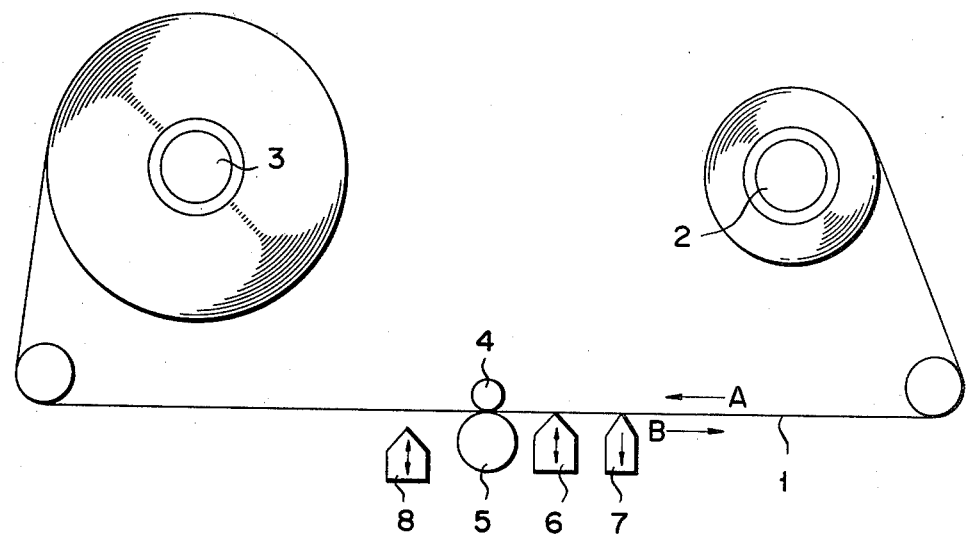
FIG. 1 is a view for explaining the relative positions between parts or elements constituting a magnetic tape reproduction device according to an embodiment of the invention.
Figure 2:
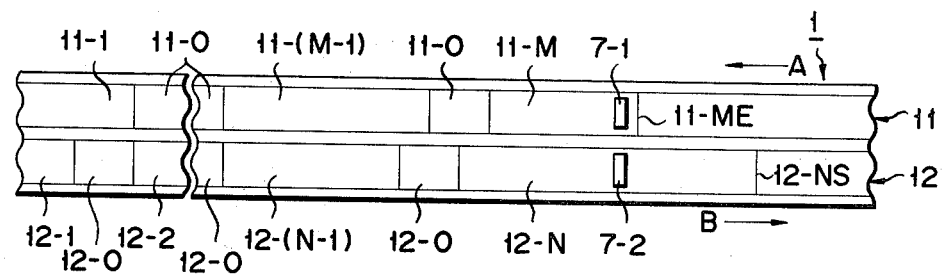
FIGS. 2 and 3 are views for explaining the recorded state of information of a magnetic tape used in the magnetic tape reproduction device.
Figure 3:
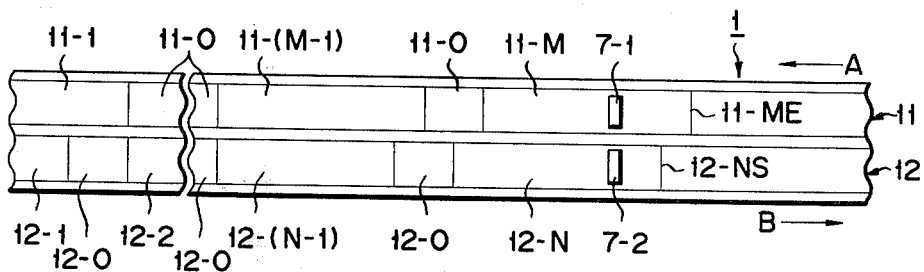

FIG. 1 shows the positional relation between principal parts of a cassette tape recorder which is used to record and reproduce information in a tape 1 and automatically reverse the tape 1. In FIG. 1, the tape 1 is fed at a specified speed by the actions of a capstan shaft 4 and pinch roller 5 in a direction indicated by an arrow A, i.e., from a feed reel 2 toward a winding reel 3. A recording/reproducing head 6, together with a detector 7 for detecting a terminal end of the tape 1 or non-signal portions between the items of information recorded therein, is slidably contacted with the tape 1, while a recording/reproducing head 8 is set at a position spaced from the tape 1. When the tape 1 is travelling in a direction indicated by an arrow B which is opposite to the arrow A-indicated direction, the head 6 is disengaged from the tape 1 and the head 8 is engaged in slidably contact with the tape 1. The tape, as shown in FIGS. 2 and 3, is of two-track monaural type. It has first and second recording bands or tracks 11 and 12 each of which records a plurality of information items. When, in the mode of reproduction, the tape 1 travels in the arrow A-indicated direction, information recorded on the recording band 11 is reproduced by means of the recording/reproducing head 6. On the other hand, when, the tape 1 travels in the arrow B-indicated direction in the mode of reproduction, information recorded on the recording band 12 is reproduced by the recording/reproducing head 8. Note here that for convenience of explanation erasing heads are not shown which operate in interlocking relation with the respective recording/reproducing heads 6 and 8.

As shown in FIGS. 2 and 3, the first recording band 11 is recorded with a plurality of information items 11-1, 11-2 --- 11 - (M-1), and 11-M each of which is followed by a non-signal zone 11-0 having a suitable length. Further the second recording band 12 is recorded with a plurality of information items 12-1, 12-2, --- 12 - (N-1) and 12-N each of which is followed by a non-signal zone 12-0 having a suitable length. The detector 7 has detecting heads 7-1 and 7-2 which are provided in correspondence to the first and second recording bands 11 and 12, respectively. When the first recording band 11 is subjected to reproduction of the information, the detecting head 7-1 is brought into slidable contact with this band 11 thereby to detect the non-signal zones in the same. When the second recording band 12 is subjected to reproduction of the information, the detecting head 7-2 is brought into slidable contact with this band 12 thereby to detect the non-signal zones in the same.

Figure 4:
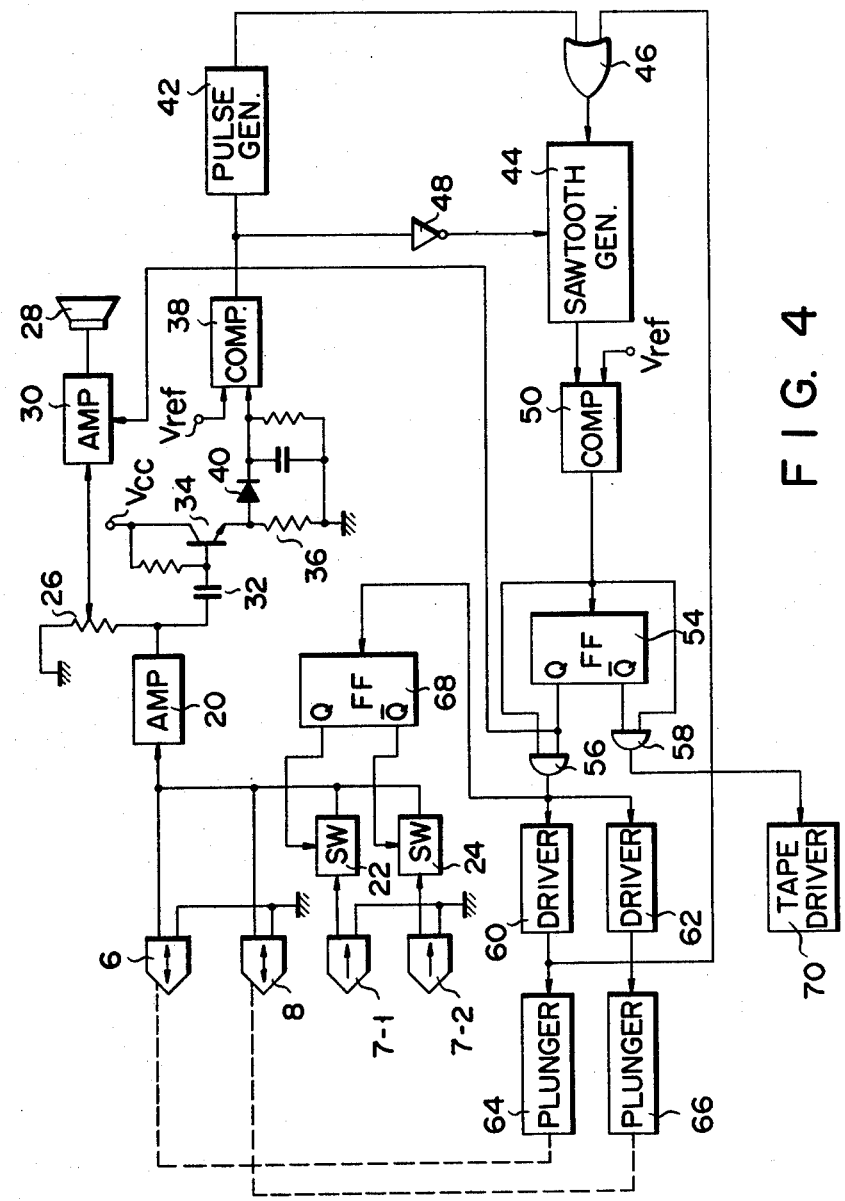
FIG. 4 is a circuit diagram of the magnetic tape reproduction device.

FIG. 4 shows a circuit construction of the magnetic tape reproduction device according to an embodiment of the invention. Referring to FIG. 4, the recording/reproducing heads 6 and 8 are coupled to an amplifier 20, and the detecting heads 7-1 and 7-2 are coupled to the amplifier 20 through analogus switches 22 and 24, respectively. An output terminal of the amplifier 20 is coupled to one end of a variable resistor 26 for controlling the sound volume of the information reproduced. A sliding terminal of the variable resistor 26 is coupled to a speaker 28 through an amplifier 30. The output terminal of the amplifier 20 is coupled also to an A M wave detector circuit which includes a capacitor 32 and a transistor 34 having its base coupled to the capacitor 32 and its collector coupled to a power supply $V_{cc}$. The emitter of the transistor 34 is grounded through a resistor 36 and is coupled to one input terminal of a voltage comparator 38 the other input terminal of which is applied with a reference voltage $V_{ref}$. The output terminal of the voltage comparator 38 is coupled to a pulse generator 42 the output terminal of which is coupled to an input terminal of a saw-tooth wave generator 44 through an OR gate 46, and is also coupled to a control terminal of the generator 44 through an inverter 48. The generator 44 is coupled to one input terminal of a voltage comparator 50 the other input terminal of which is applied with a reference voltage $V_{ref}$. The output terminal of the voltage comparator 50 is coupled to an input terminal of a T type flip-flop 54.

The output terminals Q and $\overline{Q}$ of the T type flip-flop 54 are coupled to one input terminals of AND gates 56 and 58, respectively the other input terminals of which are coupled to the output terminal of the comparator 50. The output terminal of the AND gate 56 is coupled to the input terminals of driver circuits 60 and 62 the output terminals of which are coupled to plungers 64 and 66, respectively. These plungers, in response to output pulse signals from the respective driver circuits 60 and 62, cause the recording/reproducing heads 6 and 8 to be brought into slidable contact with the tape 1. The output terminal of the AND gate 56 is also coupled to the input terminal of a T type flip-flop 68, the Q and $\overline{Q}$ output terminals of which are coupled to the control terminals of analogue switches 22 and 24, respectively. The output of the AND gate 58 is coupled to a tape driving mechanism 70 for driving the tape 1.

Hereinafter, the operation of the circuits illustrated in FIG. 4 will be explained while referring to the magnetic tape illustrated in FIG. 2 and the signal waveforms illustrated in FIG. 5.

Figure 5A:
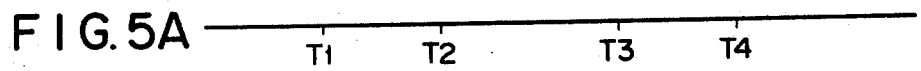
FIGS. 5A-H and 6A-B illustrate signal waveforms for explaining the operation of the magnetic tape reproduction circuit shown in FIG. 4.
Figure 5B:
Figure 5C:
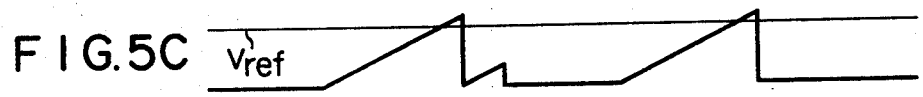
Figure 5D:
Figure 5E:
Figure 5F:
Figure 5G:

Consider a case where, as shown in FIG. 2, the magnetic tape is driven in the arrow A-indicated direction and information 11-M recorded on the first recording track 11 is being reproduced by the recording/reproducing head 6. In this reproduction state, the tape 1 has the head 6 slidably contacted therewith by the plunger 64, the information zone 11-M is drawn out from a loud speaker 28 as a sound signal through the amplifiers 20 and 30, and a high level signal is generated from the output terminal Q of the flip-flop circuit 68 to turn off the switch 22. When the detecting head 7-1 detects the recorded information of the tape 1, a high level output signal is generated from this head 7-1 and is supplied to the comparator 38 through the amplifier 20, capacitor 32, transistor 34 and diode 40. Upon receipt of the high level input signal, the comparator 38 generates a high level signal which is applied to the control terminal of the saw-tooth wave signal generator 44 through the inverter 48 to reset the same to prevent the generation of a saw-tooth wave signal. When, in this reproducing operation, the detecting head 7-1 has detected the terminal end portion 11-ME of the recorded information 11-M, i.e., a non-signal portion which follows this recorded information 11-M, a low level signal is generated from the detecting head 7-1. This means that as shown in FIGS. 5A and 5B this low level signal is supplied to the comparator 38 at the point of time $T_1$. Upon receipt of this low level output signal, the comparator 38 generates a low level signal to energize the pulse generator 42 to cause such a saw-tooth wave signal as shown in FIG. 5C to be generated from the saw-tooth wave signal generator 44. When the non-signal region following the recorded information zone 11-M is of larger length and the period of time during which this non-signal region is detected has reached a specified period of time T, the level of the saw-tooth wave signal from the saw-tooth wave signal generator 44 becomes equal to and then exceeds that of the reference voltage $V_{ref}$ at the point of time $T_2$. Upon receipt of an output signal from the generator 44 which has a higher level than the reference voltage $V_{ref}$, the comparator 50 operates to supply pulse shown in FIG. 5D to the flip-flop 54. The flip-flop 54 so operates as to invert its output level to produce from its output terminals Q and $\overline{Q}$ output signals of low and high levels as shown, respectively, in FIGS. 5E and 5F. At this time, from the AND gate 56 is produced such a pulse as shown in FIG. 5G and this pulse is supplied to the flip-flop 68 to cause the flip-flop 68 to invert its output levels, so that flip-flop 68 produces from its output terminals Q and $\overline{Q}$ output signals of low and high levels. Thus, the analogue switch 24 is closed. Further, the driving circuit 60 which has driven the plunger 64, upon receipt of the output pulse from the AND gate 56, stops energizing the plunger 64 to cause the head 6 to disengage from the tape 1. On the other hand, the driving circuit 62 which has ceased to operate, upon receipt of the output pulse from the AND gate 56, starts to energize the plunger 66 to cause the head 8 to be brought into slidable contact with the tape 8.

In this manner, the recorded information 12-N in the second track 12 of the tape 1 which travels in the arrow A-indicated direction is detected by the heads 8 and 7-2. Since, however, the amplifier 30 is supplied with a prohibiting signal from the output terminal Q of the flip-flop 54, no sound is generated from the loud speaker 28.

Figure 5H:
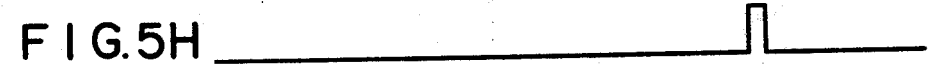

Further, since, in this state, the comparator 38 is supplied with an output signal of high level from the amplifier 20, it produces a high level output signal, thereby to prohibit the saw-tooth wave signal generator 44 from generating an output signal. When, thereafter, at the point of time $T_3$, the detecting head 7-2 has detected the initial end 12-NS of the recorded information 12-N in the second track 12, an output signal of low level is produced from the comparator 38 and a saw-tooth wave output signal is generated from the saw-tooth wave signal generator 44. When, thereafter, a non-signal region continues to be detected by the head 7-2 for a specified period of time, at the point of time $T_4$ the saw-tooth wave signal from the generator 44 becomes higher in level than the reference voltage and the output pulse shown in FIG. 5D is applied from the comparator 50 to invert the output level of the flip-flop 54, so that high and low level output signals are generated from its output terminals Q and $\overline{Q}$, respectively. At this time, supplied from the AND gate 58 to the tape driving mechanism 70 is such a pulse as shown in FIG. 5H, which causes the tape 1 to travel in an opposite direction indicated by the arrow B.

Figure 6A:
Figure 6B:

With regard also to the tape 1 shown in FIG. 3, the switch 24 is closed, at the point of time $T_2$, in the same manner as mentioned above. Thus, the head 8 is brought into slidable contact with the tape 1. At this time, unlike the FIG. 2 case, a non-signal region of the second track 12 is immediately detected by the detecting head 7-2. This means that, as shown in FIG. 6A, a saw-tooth wave signal is generated from the generator 44 without intermittence. Upon receipt of this signal, the comparator 50 generates such an output pulse as shown in FIG. 6B to carry out the same operation as mentioned in connection with the tape 1 shown in FIG. 2.

The invention has been described by referring to the foregoing embodiment but is not limited to it alone. For example, the same operation as mentioned above can be performed also by removing the detecting heads 7-1 and 7-2 and coupling switches 22 and 24 between the amplifier 20 and the recording-reproducing heads 6 and 8, respectively.

Further, where the invention is applied to, for example, 4-track & 2-channel stereo tape, the above-mentioned auto-reverse operation can be performed by providing a first detecting head for detecting the terminal ends of information bands L and R of the first channel and a second detecting head for detecting the initial ends of information bands L and R of the second channel so as to permit the first and second detecting heads to detect a non-signal region of the information band L or R of each channel in the same manner as mentioned above.

Further, an auto-reverse control switch for manually controlling the operation of, for example, the saw-tooth wave signal generator 44 shown in FIG. 4 can be coupled to this generator. When the auto-reverse control switch is operated during a time period in which information recorded in the first recording track 11 is reproduced, the travel of the tape can be reversed in the same manner as described above and the nearest information recorded in the second recording track 12 may be reproduced from the initial end of this nearest recorded information.

What is claimed is:

1. A magnetic tape reproduction device comprising:
    tape driving means for driving a magnetic tape having a plurality of recording tracks,
    reproducing means for reproducing information recorded in the magnetic tape,
    detecting means which produces a first output signal when having detected that an output signal corresponding to a non-signal region of a first recording tract of the tape continues to be produced for a specified period of time from said reproducing means while the tape is driven in first direction for signals recorded on the first track to be reproduced by said reproducing means, and which produces a second output signal when having detected that an output signal corresponding to a non-signal region of a second track of the tape continues to be produced for a specified period of time from said reproducing means while the tape is driven in said first direction,
    first control means responsive to the first output signal from the detecting means for supplying an output signal to set the reproducing means in a first operation mode to pick information recorded on the second recording track, and
    second control means responsive to the second output signal from the detecting means for applying its output signal to the driving circuit to drive the tape in a second direction opposite to said first direction.

2. A magnetic tape reproduction device according to claim 1, wherein said detecting means comprises:
    a first-signal generating circuit coupled to said reproducing means and, when said reproducing means continues to detect a non-signal region of said magnetic tape, generates an output signal of constant level,
    a detecting circuit which produces an output signal when having detected that the output signal of constant level from said first-signal generating circuit continues to be generated for more than a specified period of time, and
    a second-signal generating circuit which is alternately set to first and second states in response to the output signal from said detecting circuit and at the point of time when having been set to said first state generates said first output signal and at the point of time when having been set to said second state generates said second output signal.

3. A magnetic tape reproduction device according to claim 2, wherein said detecting circuit comprises a saw-tooth wave signal generating circuit generating a saw-tooth wave signal in response to the output signal of constant level from said first-signal generating circuit and a comparator which compases a reference signal with an output signal from said saw-tooth wave signal generating circuit and produces an output signal when the output signal from said saw-tooth wave signal generating circuit has reached the level of said reference signal.

4. A magnetic tape reproduction device according to claim 2 or 3, wherein said second-signal generating circuit comprises a flip-flop which has output terminals Q and $\overline{Q}$ and in response to the output signal from said detecting circuit inverts the output state, a first AND circuit coupled to the output terminal of said flip-flop and to the output terminal of said detecting circuit, and a second AND circuit coupled to the output terminal $\overline{Q}$ of said flip-flop and to the output terminal of said detecting circuit.

5. A magnetic tape reproduction device according to claim 2 or 3, wherein said first-signal generating circuit comprises a comparator which receives the output signal from said reproducing means and a reference signal and when the output signal from said reproducing means becomes equal in level to said reference signal, produces said output signal of constant level.

6. A magnetic tape reproduction device according to claim 1, 2 or 3, wherein said reproducing means comprises a plurality of reproducing heads which are disposed in correspondence to said plurality of recording tracks to reproduce the recorded information of said tape and also detect a non-signal region of said tape.

7. A magnetic tape reproduction device according to claim 1, 2 or 3, wherein said reproducing means comprises a plurality of reproducing heads which are disposed in correspondence to said plurality of recording tracks to reproduce the recorded information of said tape, and a plurality of detecting heads which are disposed in correspondence to said plurality of recording tracks to detect a non-signal region of said tape.

* * * * *